(12) United States Patent
Fukami et al.

(10) Patent No.: US 7,516,008 B2
(45) Date of Patent: Apr. 7, 2009

(54) VEHICLE MOTION CONTROL APPARATUS

(75) Inventors: Masanobu Fukami, Isshiki-cho (JP); Hirohisa Tanaka, Nagoya-shi (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 500 days.

(21) Appl. No.: 11/269,845

(22) Filed: Nov. 9, 2005

(65) Prior Publication Data
US 2006/0113837 A1 Jun. 1, 2006

(30) Foreign Application Priority Data
Nov. 30, 2004 (JP) ............... 2004-345884

(51) Int. Cl.
*B60T 8/24* (2006.01)
(52) U.S. Cl. ............... 701/70; 701/82; 701/83; 303/139; 303/140
(58) Field of Classification Search ............ 701/70–72, 701/82–83; 303/122.01, 139–140, 146, 151
See application file for complete search history.

(56) References Cited

U.S. PATENT DOCUMENTS 5,964,819 A * 10/1999 Naito .................. 701/72
7,162,333 B2 * 1/2007 Koibuchi et al. ........... 701/1
7,316,457 B2 * 1/2008 Taniguchi et al. ......... 303/147

2004/0102888 A1 5/2004 Burgdorf et al.

FOREIGN PATENT DOCUMENTS

| DE | 42 22 958 A1 | 1/1994 |
| EP | 0 914 997 A2 | 5/1999 |
| EP | 1 110 835 A2 | 6/2001 |
| JP | 2004-506572 A | 4/2004 |

OTHER PUBLICATIONS

Official Action issued by the German Patent Office in corres. DE Patent Application No. 10 2005 056 676.6-21, Jul. 7, 2008; and English-language translation thereof.

* cited by examiner

*Primary Examiner*—Yonel Beaulieu
(74) *Attorney, Agent, or Firm*—Buchanan Ingersoll & Rooney PC

(57) ABSTRACT

This vehicle motion control apparatus obtains a yaw rate deviation by subtracting the value (actual-yaw-rate-after-low-pass-filter-process Yrfilter), which is obtained by providing with a time constant τ1 (>τ2) the low-pass filter process to the actual yaw rate Yr obtained from the yaw rate sensor incorporated in the HU, from the value (turning-angle-yaw-rate-after-low-pass-filter-process Yrtfilter) obtained by providing with the time constant τ2 the low-pass filter process to the turning angle yaw rate Yrt obtained on the basis of the actual steering angle obtained from the steering angle sensor, which is provided separate from the hydraulic unit HU. When this yaw rate deviation exceeds the threshold value Yrth (time t3'), this apparatus starts an under-steer suppression control.

3 Claims, 10 Drawing Sheets

VEHICLE MOTION CONTROL APPARATUS

BACKGROUND OF THE INVENTION

1. Field of the Invention

The present invention relates to a vehicle motion control apparatus.

2. Description of the Related Art

Conventionally, there has been widely known a vehicle motion control apparatus that performs a vehicle stabilization control in order to maintain running stability of the vehicle during turning. Specifically, a vehicle motion control apparatus of such a type determines that the vehicle is in a state of under-steer, for example, when the difference between a vehicle yaw rate (hereinafter referred to as "actual yaw rate") obtained from a yaw rate sensor (or a lateral acceleration sensor) and a yaw rate (hereinafter referred to as "turning angle yaw rate") calculated from steering angle (turning angle of the steerable wheels) obtained from a steering angle sensor (and vehicle body speed, specifications of the vehicle, etc.,) exceeds a predetermined threshold value.

In case where the apparatus of such a type determines that the vehicle is in an under-steer, in general, it imparts a predetermined braking force, by means of brake hydraulic pressure, to the rear wheel located on the inner side of a turning locus in order to generate a yawing moment (under-steer suppressing moment) in the vehicle in a direction same as the vehicle's yawing direction. With this operation, the under-steer suppression control is executed, whereby a yaw rate deviation is controlled to be not more than the threshold value.

This apparatus is composed of an integrated unit made integrally of a hydraulic unit having mounted thereto plural solenoid valves and plural hydraulic devices such as a hydraulic pump that are required for controlling braking force exerted on wheels, and an electronic control apparatus (ECU) for controlling plural hydraulic devices; and various sensors such as the aforesaid yaw rate sensor, steering angle sensor, and the like, which are separate from the integrated unit and connected to the integrated unit via harnesses, connectors or the like. In this case, the integrated unit executes the aforesaid vehicle stabilization control in receipt of signals from various sensors via a so-called CAN communication.

In recent years, a technique has been developed for incorporating the yaw rate sensor (or lateral acceleration sensor) into the integrated unit (e.g., see the following Patent Reference 1). According to this technique, harnesses and connectors can be omitted, and further, electronic parts such as a CPU, CAN driver or the like in the yaw rate sensor required for the CAN communication can also be omitted, so that the manufacturing cost for the whole apparatus can be reduced.

[Patent Reference]

Japanese National Publication No. 2004-506572

In the integrated unit, a vibration is generated by the operation of the hydraulic devices such as hydraulic pump, solenoid valves or the like mounted to the integrated unit. In addition, the integrated unit is indirectly fixed to the vehicle body via a mount, so that the vibration at the side of the vehicle body received from the road surface can be amplified by the resonance and transmitted to the integrated unit.

Accordingly, when the yaw rate sensor is incorporated in the integrated unit, various vibrations given to the integrated unit can directly be transmitted to the yaw rate sensor, and hence, the vibration imparted to the yaw rate sensor increases. When the vibration imparted to the yaw rate sensor increases, the value of the actual yaw rate (see bold broken line) is liable to be fluctuating (vibration noise is liable to be superimposed) with respect to the value of the true yaw rate (see two-dot-chain line) as shown in FIG. 10. As a result, the value of the yaw rate deviation is also liable to be fluctuating, so that there may be a possibility that the vehicle stabilization control is not appropriately executed.

From the above, the apparatus disclosed in the aforesaid Reference calculates, instead of the actual yaw rate itself obtained from the yaw rate sensor incorporated in the integrated unit, the yaw rate deviation based upon the value obtained by providing a low-pass filter process to the actual yaw rate, and starts the vehicle stabilization control (e.g., under-steer suppression control) when the yaw rate deviation exceeds the threshold value.

However, the following problem arises by this configuration. It is supposed that the true yaw rate deviation, which is obtained by subtracting the true yaw rate from the turning angle yaw rate, exceeds the threshold value at time t2 as shown in FIG. 10, i.e., that the vehicle stabilization control (specifically, under-steer suppression control) should be started at time t2.

In general, when a low-pass filter process is provided to the fluctuating signal (value), the value to which the low-pass filter has been provided fluctuates with the delay according to the time constant of the low-pass filter from the value to which the low-pass filter has not yet been provided. Accordingly, as shown in FIG. 10, the value, which is obtained by providing the low-pass filter to the actual yaw rate (bold broken line) (actual-yaw-rate-after-low-pass-filter-process, see thin broken line), also fluctuates with the delay from the actual yaw rate.

This acts in the direction in which the value of the yaw rate deviation (i.e., the value obtained by subtracting the actual-yaw-rate-after-low-pass-filter-process from the turning angle yaw rate) increases under the condition where the true yaw rate deviation increases, i.e., under the condition where the point when the vehicle stabilization control should be started reaches.

This allows the yaw rate deviation to exceed the threshold value at time t1 that is before time t2, regardless of the fact that the true yaw rate deviation does not exceed the threshold value before time t2. As a result, there arises a problem that a malfunction may be caused in which the under-steer suppression control is started earlier from time t1.

SUMMARY OF THE INVENTION

In view of the foregoing, an object of the present invention is to provide a vehicle motion control apparatus that executes a vehicle stabilization control on the basis of a value obtained by providing a low-pass filter process to an output value from a yaw rate sensor or the like incorporated in an integrated unit, wherein occurrence of a malfunction can be suppressed.

A vehicle motion control apparatus according to the present invention comprises an integrated unit integrally composed of a hydraulic unit having mounted thereto plural hydraulic devices for controlling braking force imparted to wheels of a vehicle and an electronic control apparatus for controlling the plural hydraulic devices; an actual-yaw-rate-corresponding-value sensor that is incorporated in the integrated unit and detects a yaw-rate-corresponding-value indicating a degree of a turn of the vehicle as an actual-yaw-rate-corresponding-value; and an actual-turning-angle-corresponding-value sensor that detects a turning-angle-corresponding-value corresponding to a turning angle of steerable wheels of the vehicle as an actual-turning-angle-corresponding-value.

Here, the "hydraulic devices" include, for example, a hydraulic pump (including a motor for driving this hydraulic pump) for automatically generating brake hydraulic pressure regardless of a brake operation by a driver, plural solenoid valves for independently adjusting a wheel cylinder hydraulic pressure of each wheel, and the like.

Further, the "yaw-rate-corresponding-value" is a value representing a degree of a turn of a vehicle. For example, it is a yaw rate itself of a vehicle, a lateral acceleration of a vehicle, or the like. Accordingly, the actual-yaw-rate-corresponding-value sensor is, for example, a yaw rate sensor detecting an actual yaw rate, a lateral acceleration sensor detecting an actual lateral acceleration, or the like. The "turning-angle-corresponding-value" is a value corresponding to a turning angle of a steerable wheel of a vehicle. For example, it is a turning angle itself of a steerable wheel, a steering angle, or the like. Accordingly, the actual-turning-angle-corresponding-value sensor is, for example, a turning angle sensor detecting an actual turning angle, a steering angle sensor detecting an actual steering angle, or the like.

The feature of the present invention is that, in the vehicle motion control apparatus, the electronic control apparatus has yaw-rate-deviation-corresponding-value obtaining means that obtains a yaw-rate-deviation-corresponding-value, which represents a degree of instability relating to a turn of the vehicle, at least on the basis of a degree of a difference between a turning-angle-yaw-rate-corresponding-value, which is the yaw-rate-corresponding-value obtained based upon the detected turning-angle-corresponding-value and to which a low-pass filter process is provided, and a value obtained by providing a low-pass filter process to the detected actual-yaw-rate-corresponding-value; and vehicle stabilization control executing means that controls the plural hydraulic devices such that braking force for generating on the vehicle a yawing moment in the direction in which the yaw-rate-deviation-corresponding-value becomes not more than a threshold value is imparted to a predetermined wheel, when the obtained yaw-rate-deviation-corresponding-value exceeds the threshold value. Notably, the threshold value is preferably changed in accordance with a vehicle speed and/or the turning-angle-corresponding-value. Specifically, the threshold value is preferably set to be larger as the vehicle speed becomes smaller.

Here, the "turning-angle-yaw-rate-corresponding-value" is, for example, a yaw-rate-corresponding-value (i.e., the aforesaid turning angle yaw rate or the like) of a vehicle calculated from an actual steering angle as an actual-turning-angle-corresponding-value, a vehicle speed, specifications of a vehicle (steering gear ratio, wheel base) or the like. The "turning-angle-yaw-rate-corresponding-value to which the low-pass filter process is provided" is a turning-angle-yaw-rate-corresponding-value calculated by using a value obtained by providing the low-pass filter process to the actual-turning-angle-corresponding-value (e.g., actual steering angle or the like) detected by the actual-turning-angle-corresponding-value sensor, or a value obtained by providing the low-pass filter process to the turning-angle-yaw-rate-corresponding-value, which is calculated by using the actual-turning-angle-corresponding-value itself detected by the actual-turning-angle-corresponding-value sensor.

Further, the "yaw-rate-deviation-corresponding-value" is a value representing a degree of the instability relating to the turn of the vehicle. For example, it is a difference (e.g., the aforesaid yaw rate deviation) between the "turning-angle-yaw-rate-corresponding-value to which the low-pass filter process is provided" and "the value obtained by providing a low-pass filter process to the actual-yaw-rate-corresponding-value", or the ratio thereof.

With this configuration, upon obtaining the yaw-rate-deviation-corresponding-value (e.g., yaw rate deviation), the low-pass filter process is provided not only to the actual-yaw-rate-corresponding-value but also to the turning-angle-yaw-rate-corresponding-value. As described above, calculating the yaw-rate-deviation-corresponding-value based upon "the value obtained by providing the low-pass filter process to the actual-yaw-rate-corresponding-value" exerts in the direction for increasing the yaw-rate-deviation-corresponding-value under the condition where the actual yaw rate deviation increases.

On the other hand, "the turning-angle-yaw-rate-corresponding-value to which the low-pass filter process is provided" fluctuates with the delay from the turning-angle-yaw-rate-corresponding-value (the value to which the low-pass filter process is not provided). Accordingly, calculating the yaw-rate-deviation-corresponding-value based upon "the turning-angle-yaw-rate-corresponding-value to which the low-pass filter process is provided" exerts in the direction for decreasing the yaw-rate-deviation-corresponding-value under the condition where the actual yaw rate deviation increases (the detail will be described later).

From the above, adjusting the low-pass filter characteristic (response) in the low-pass filter process to the turning-angle-yaw-rate-corresponding-value and the low-pass filter characteristic (response) in the low-pass filter process to the actual-yaw-rate-corresponding-value can maintain the yaw-rate-deviation-corresponding-value (e.g., the aforesaid yaw rate deviation) so as to be not more than the true yaw-rate-deviation-corresponding-value (e.g., the aforesaid true yaw rate deviation) during the process for increasing the true yaw rate deviation.

As a result, the occurrence of the malfunction in which the vehicle stabilization control is started earlier can be suppressed as much as possible during the process in which the true yaw rate deviation increases, i.e., under the condition in which a point when the vehicle stabilization control should be started has come.

In this case, it is preferable that the yaw-rate-deviation-corresponding-value obtaining means is configured such that a response of a low-pass filter in the low-pass filter process to the turning-angle-yaw-rate-corresponding-value is higher than a response of a low-pass filter in the low-pass filter process to the actual-yaw-rate-corresponding-value.

Specifically, it is preferable that the yaw-rate-deviation-corresponding-value obtaining means is configured such that a time constant (hereinafter referred to as "turning-angle-yaw-rate-side time constant"), which is a index value of the response, of the low-pass filter in the low-pass filter process to the turning-angle-yaw-rate-corresponding-value is less than a time constant (hereinafter referred to as "actual-yaw-rate-side time constant"), which is a index value of the response, of the low-pass filter in the low-pass filter process to the actual-yaw-rate-corresponding-value.

For example, supposing that the turning-angle-yaw-rate-side time constant takes the value same as the actual-yaw-rate-side time constant. In this case, the degree in the delay of the fluctuation of "the value obtained by providing the low-pass filter process to the actual-yaw-rate-corresponding-value" becomes equal to the degree in the delay of the fluctuation of "the turning-angle-yaw-rate-corresponding-value to which the low-pass filter process is provided".

With this configuration, the fluctuation of the true-yaw-rate-deviation-corresponding-value appears as the fluctuation of the yaw-rate-deviation-corresponding-value with the delay of the time according to the aforesaid time constant. Specifically, the point when the yaw-rate-deviation-corresponding-value exceeds the threshold value is delayed by the time according to the aforesaid time constant from the point when the true-yaw-rate-deviation-corresponding-value exceeds the threshold value.

This means that the point when the vehicle stabilization control is started is always delayed from the point when the vehicle stabilization control should originally be started by the time according to the aforesaid time constant. Therefore, when the actual-yaw-rate-side time constant (and the turning-angle-yaw-rate-side time constant) is set greater in order to eliminate the vibration noise superimposed on the actual-yaw-rate-corresponding-value, the point when the vehicle stabilization control is started is greatly delayed from the point when the vehicle stabilization control should originally be started.

On the other hand, when the turning-angle-yaw-rate-side time constant is set smaller than the actual-yaw-rate-side time constant as in the aforesaid configuration, the degree in the delay of the fluctuation of "the turning-angle-yaw-rate-corresponding-value to which the low-pass filter process is provided" becomes small, compared to the case where the turning-angle-yaw-rate-side time constant takes the value same as the actual-yaw-rate-side time constant.

This exerts in the direction in which the yaw-rate-deviation-corresponding-value increases, accordingly, in the direction in which the point when the vehicle stabilization control is started is advanced. As a result, even if the actual-yaw-rate-side time constant is set greater in order to eliminate the vibration noise superimposed on the actual-yaw-rate-corresponding-value, the degree in the delay of the point when the vehicle stabilization control is started can be reduced.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 6 is a flowchart showing a routine executed by the CPU shown in FIG. 1 for calculating wheel speeds and the like;

DESCRIPTION OF THE PREFERRED EMBODIMENT

Figure 1:
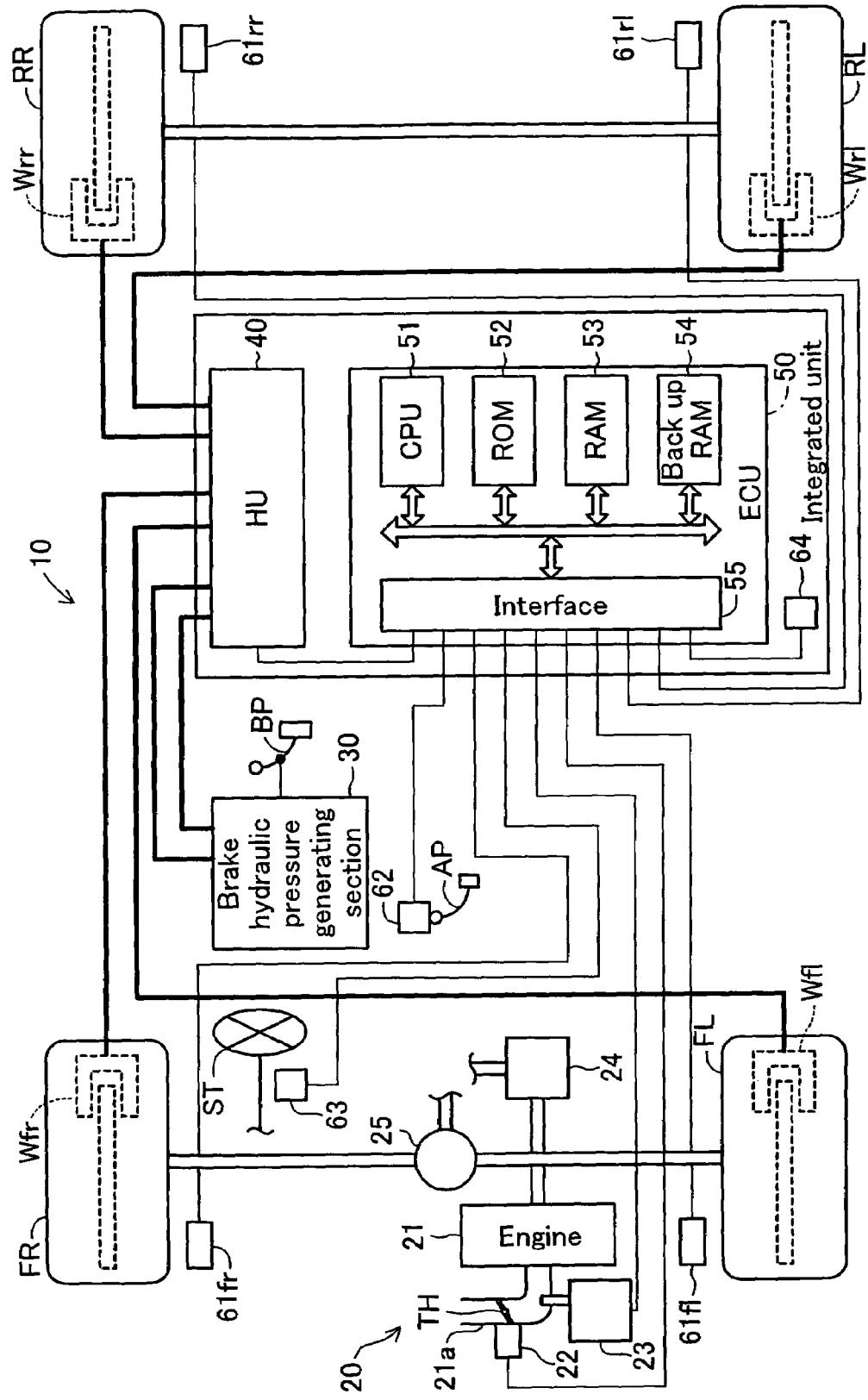
FIG. 1 is a schematic structural diagram of a vehicle equipped with a vehicle motion control apparatus according to an embodiment of the present invention.

Below, a vehicle motion control apparatus according to an embodiment of the present invention will be described while referring to the drawings. FIG. 1 schematically illustrates a vehicle on which a motion control apparatus 10 according to the embodiment of the present invention is mounted. The illustrated vehicle is a front-wheel-drive vehicle.

This motion control apparatus 10 has a drive force transmission mechanism section 20 which generates a drive force and transmits it to drive wheels FL, FR, RL and RR; a brake hydraulic pressure generating section 30 for generating a brake hydraulic pressure in each wheel by a brake operation by a driver; and an integrated unit integrally composed of a hydraulic unit 40 (hereinafter simply referred to as "HU 40") and an electronic control apparatus 50 (hereinafter simply referred to as "ECU 50"). This integrated unit is fixed to the vehicle body via a predetermined mount made of an elastic member.

The drive force transmission mechanism section 20 comprises an engine 21 which generates a drive force; a throttle valve actuator 22 which controls the opening TA of a throttle valve TH which is disposed in an intake pipe 21a of the engine 21 and which varies the open cross-sectional area of the intake passage; a fuel injection apparatus 23 which includes fuel infectors which spray fuel in the vicinity of unillustrated intake ports of the engine 21.

The drive force transmission mechanism section 20 also comprises a transmission 24 whose input shaft is connected to the output shaft of the engine 21; and a front-wheel-side differential 25 which is connected to the output shaft of the transmission 24 and properly distributes and transmits the drive force from the engine 21 to the front wheels FL and FR.

Figure 2:
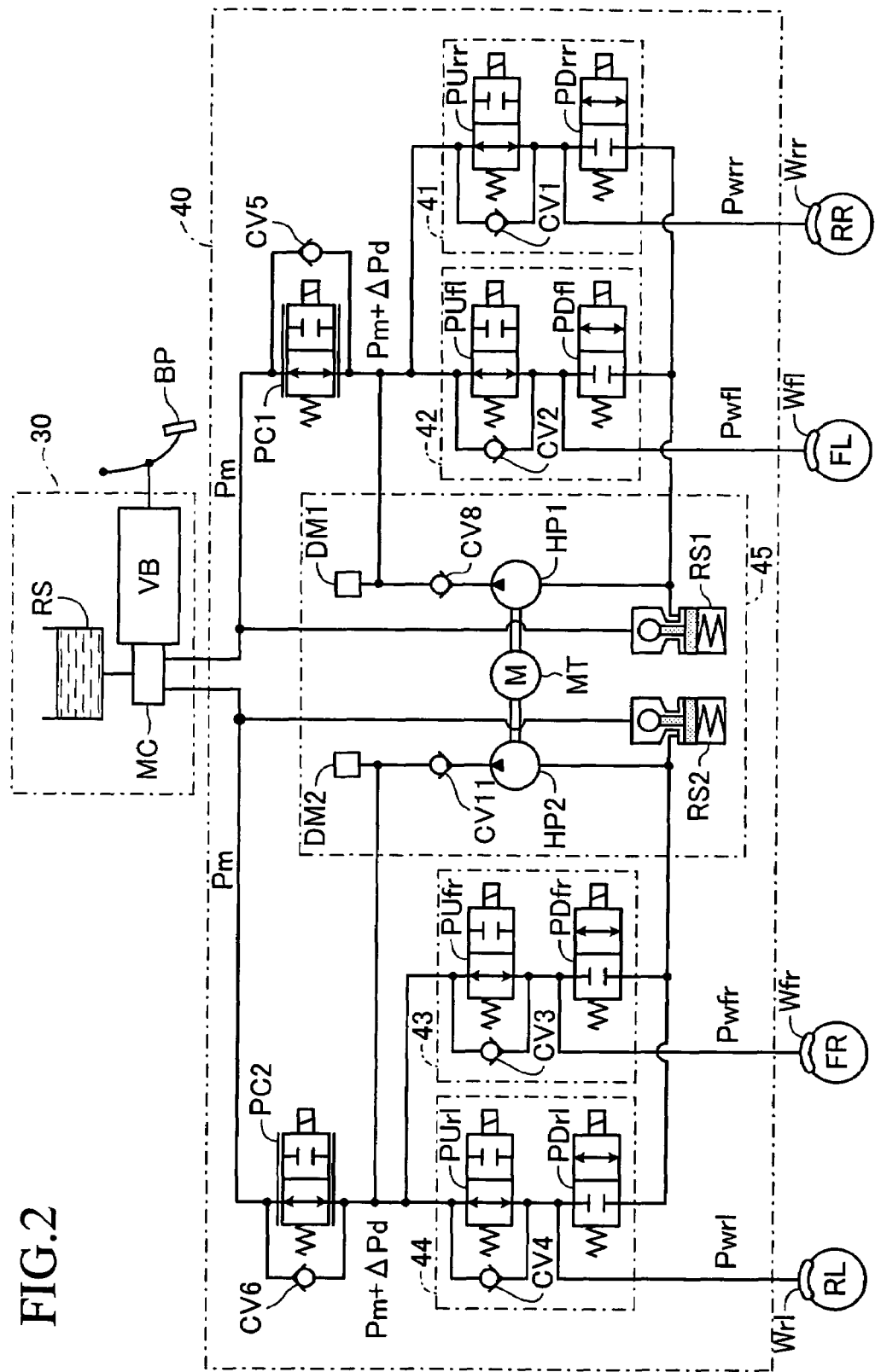
FIG. 2 is a schematic structural diagram of the brake hydraulic pressure generating section and hydraulic unit shown in FIG. 1.

As schematically shown in FIG. 2, the brake hydraulic pressure generating section 30 includes a vacuum booster VB which operates in response to operation of the brake pedal BP, and a master cylinder MC which is linked to the vacuum booster VB. The vacuum booster VB utilizes the pressure (negative pressure) of air within an intake pipe of the engine 21 so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder hydraulic pressure Pm corresponding to the boosted operating force. The master cylinder MC also generates from the second port a second master cylinder hydraulic pressure Pm which is substantially the same as the first master cylinder hydraulic pressure and which corresponds to the boosted operating force.

The structures and operations of the master cylinder MC and the vacuum booster VB are well known, and therefore an explanation of the details thereof will be omitted. In this manner, the master cylinder MC and the vacuum booster VG generates first and second master cylinder hydraulic pressures corresponding to the operating force of the brake pedal BP.

As schematically shown in FIG. 2, the HU 40 is configured to include RR brake hydraulic pressure adjusting section 41, FL brake hydraulic pressure adjusting section 42, FR brake hydraulic pressure adjusting section 43 and RL brake hydraulic pressure adjusting section 44, each of which can adjust the brake hydraulic pressure supplied to each of wheel cylinders Wrr, Wfl, Wfr and Wrl arranged at each wheel RR, FL, FR and RL, and return brake fluid supplying section 45.

The first port of the master cylinder MC belongs to a system relating to the wheels RR and FL. A normally-open linear solenoid valve PC1 is interposed between the first port and the upstream side of the RR brake hydraulic pressure adjusting section 41 and the upstream side of the FL brake hydraulic pressure adjusting section 42. Similarly, the second port of the master cylinder MC belongs to a system relating to wheels FR and RL. A normally-open linear solenoid valve PC2 is interposed between the second port and the upstream side of the FR brake hydraulic pressure adjusting section 43 and the upstream side of the RL brake hydraulic pressure adjusting section 44. The details of the normally-open linear solenoid valves PC1 and PC2 will be described later.

The RR brake hydraulic pressure adjusting section 41 consists of a pressure-increasing valve Purr, which is a normally-open solenoid valve of a 2-port, 2-position type, and a pressure-reducing valve PDrr, which is a normally-closed solenoid valve of a 2-port, 2-position type. The pressure-increasing valve Purr establishes and brakes communication between the upstream side of the RR brake hydraulic pressure adjusting section 41 and the wheel cylinder Wrr, which will be described later. The pressure-reducing valve PDrr establishes and brakes communication between the wheel cylinder Wrr and a reservoir RS1. Therefore, through control of the pressure-increasing valve Purr and the pressure-reducing valve PDrr, the brake hydraulic pressure within the wheel cylinder Wrr (wheel cylinder pressure PWrr) can be increased, maintained, and reduced.

In addition, a check valve CV1 which allows flow of the brake fluid in only one direction from the wheel cylinder Wrr side to the upstream side of the RR brake hydraulic pressure adjusting section 41 is connected in parallel with the pressure-increasing valve Purr. As a result, when the brake pedal BP is released after being operated, the wheel cylinder pressure PWrr is rapidly decreased.

Similarly, the FL brake hydraulic pressure adjusting section 42, the FR brake hydraulic pressure adjusting section 43, and the RL brake hydraulic pressure adjusting section 44 comprise a pressure-increasing valve PUfl and a pressure-reducing valve PDfl, a pressure-increasing valve PUfr and a pressure-reducing valve PDfr, and a pressure-increasing valve PUrl and a pressure-reducing valve PDrl, respectively. Through control of each pressure-increasing valve and pressure-reducing valve, the brake hydraulic pressure in the wheel cylinder Wfl, the wheel cylinder Wfr, and the wheel cylinder Wrl (wheel cylinder pressures PWfl, PWfr, PWrl) can be increased, maintained, or decreased. Check valves CV2, CV3, and CV4 are provided in parallel with the pressure-increasing valves PUfl, PUfr, and PUrl, respectively, to provide the same function as that of the check valve CV1.

The return brake fluid supply section 45 includes a DC motor MT, and two hydraulic pumps (gear pumps) HP1 and HP2 simultaneously driven by the motor MT. The hydraulic pump HP1 pumps the brake fluid returned from the pressure reducing valves PDrr and PDfl to the reservoir RS1, and supplies the pumped brake fluid to the upstream sides of the RR brake hydraulic pressure adjusting section 41 and the FL brake hydraulic pressure adjusting section 42 via a check valve CV8.

Similarly, the hydraulic pump HP2 pumps the brake fluid returned from the pressure reducing valves PDfr and PDrl to the reservoir RS2, and supplies the pumped brake fluid to the upstream sides of the FR brake hydraulic pressure adjusting section 43 and the RL brake hydraulic pressure adjusting section 44 via a check valve CV11. Notably, in order to reduce pulsations of discharge pressures of the hydraulic pumps HP1 and HP2, a damper DM1 is disposed in a hydraulic circuit between the check valve CV8 and the normally-open linear solenoid valve PC1, and a damper DM2 is disposed in a hydraulic circuit between the check valve CV11 and the normally-open linear solenoid valve PC2.

Next, the normally-open linear solenoid valve PC1 will be described. The valve body of the normally-open linear solenoid valve PC1 always receives force in the opening direction stemming from urging force of an unillustrated coil spring, and also receives force in the opening direction stemming from the differential pressure obtained through subtraction of the first master cylinder pressure Pm from the pressure at the upstream side of the RR brake hydraulic pressure adjusting section 41 and the upstream side of the FL brake hydraulic pressure adjusting section 42 (hereinafter simply referred to as "actual differential pressure") and force in the closing directions stemming from attraction force which increases in proportion to current supplied to the normally-open linear solenoid valve PC1 (i.e., instruction current Id).

Figure 3:
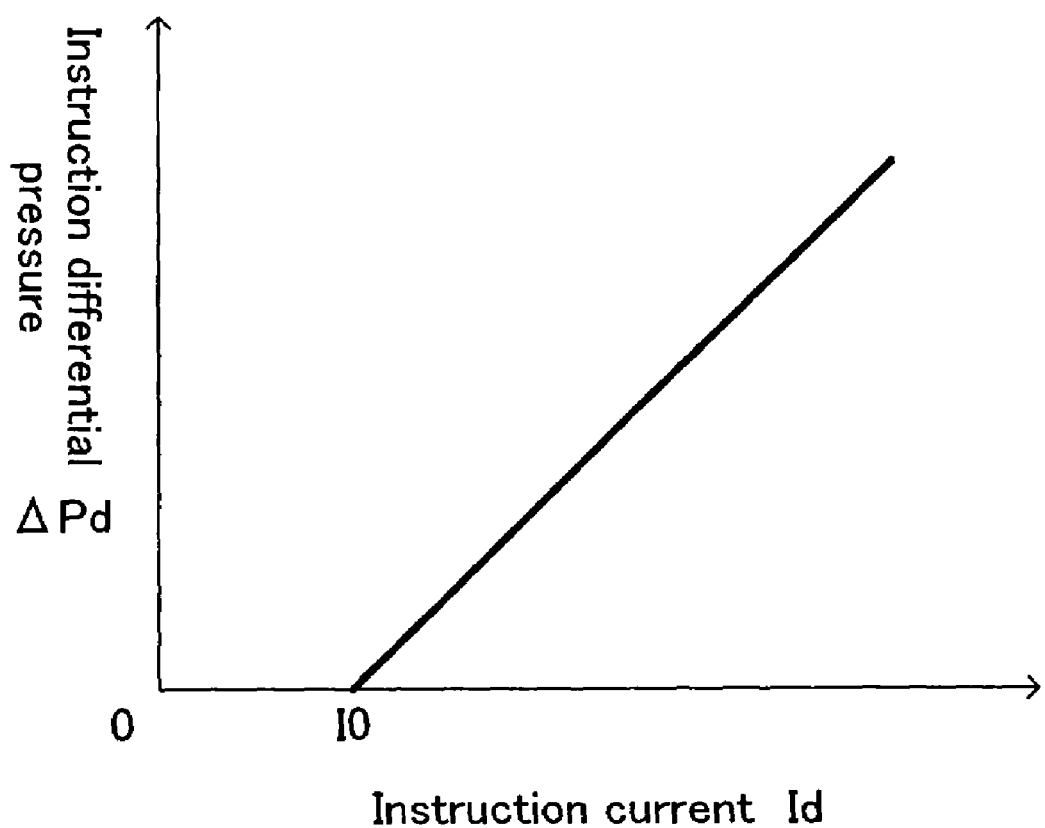
FIG. 3 is a graph showing the relation between an instruction current and an instruction differential pressure regarding the normally-open linear solenoid valve shown in FIG. 2.

As a result, as shown in FIG. 3, instruction differential pressure ΔPd corresponding to the attraction force is determined such that it increases in proportion to the instruction current Id. In FIG. 3, 10 represents a current value corresponding to the urging force of the coil spring. When the instruction differential pressure ΔPd is greater than the above-described actual differential pressure, the normally-open linear solenoid valve PC1 closes so as to brake the communication between the first port of the master cylinder MC, and the upstream portion of the RR brake hydraulic pressure adjusting section 41 and the upstream portion of the FL brake hydraulic pressure adjusting section 42.

Meanwhile, when the instruction differential pressure ΔPd is less than the actual differential pressure, the normally-open linear solenoid valve PC1 opens so as to establish the communication between the first port of the master cylinder MC, and the upstream portion of the RR brake hydraulic pressure adjusting section 41 and the upstream portion of the FL brake hydraulic pressure adjusting section 42. As a result, the brake fluid at the upstream portion of the RR brake hydraulic pressure adjusting section 41 and the upstream portion of the FL brake hydraulic pressure adjusting section 42 (supplied from the hydraulic pump HP1) flows toward the first port of the master cylinder MC via the normally-open linear solenoid valve PC1, whereby the actual differential pressure is adjusted to coincide with the instruction differential pressure ΔPd. Notably, the brake fluid flowing into the first port of the master cylinder MC is returned to the reservoir RS1.

In other words, when the motor MT (accordingly, the hydraulic pumps HP1 and HP2) is driven, the actual differential pressure (its allowable maximum value) can be controlled in accordance with the instruction current Id of the normally-open linear solenoid valve PC1. At that time, the pressure on the upstream side of the RR brake hydraulic pressure adjusting section 41 and the FL brake hydraulic pressure adjusting section 42 becomes equal to the sum (Pm+ ΔPd) of the first master cylinder pressure Pm and the actual differential pressure (i.e., the instruction differential pressure ΔPd).

Meanwhile, when the normally-open linear solenoid valve PC1 is brought into an unexcited state (i.e., when the instruction current Id is set to zero), the normally-open linear solenoid valve PC1 maintains its open state because of urging force of the coil spring. At this time, the actual differential pressure becomes zero, and the pressure on the upstream side of the RR brake hydraulic pressure adjusting section 41 and the upstream side of the FL brake hydraulic pressure adjusting section 42 becomes equal to the first master cylinder pressure Pm.

The normally-open linear solenoid valve PC2 is the same as the normally-open linear solenoid valve PC1 in terms of structure and operation. Accordingly, when the motor MT (accordingly, the hydraulic pumps HP1 and HP2) is driven, the pressure on the upstream side of the FR brake hydraulic pressure adjusting section 43 and the upstream side of the RL brake hydraulic pressure adjusting section 44 becomes equal to the sum (Pm+ΔPd) of the second master cylinder pressure Pm and the instruction differential pressure ΔPd. Meanwhile, when the normally-open linear solenoid valve PC2 is brought into an unexcited state, the pressure on the upstream side of the FR brake hydraulic pressure adjusting section 43 and the upstream side of the RL brake hydraulic pressure adjusting section 44 becomes equal to the second master cylinder pressure Pm.

In addition, a check valve CV5 which allows flow of the brake fluid in only one direction from the first port of the master cylinder MC to the upstream portion of the RR brake hydraulic pressure adjusting section 41 and the upstream portion of the FL brake hydraulic pressure adjusting section 42 is connected in parallel with the normally-open linear solenoid valve PC1. By virtue of this configuration, even during a period in which the actual differential pressure is controlled in accordance with the instruction current Id supplied to the normally-open linear solenoid valve PC1, when, upon operation of the brake pedal BP, the first master cylinder pressure Pm becomes higher than the pressure on the upstream side of the RR brake hydraulic pressure adjusting section 41 and the upstream side of the FL brake hydraulic pressure adjusting section 42, brake hydraulic pressure (i.e., the first master cylinder pressure Pm) corresponding to the operation force of the brake pedal BP can be supplied to the wheel cylinders Wrr and Wfl. Further, a check valve CV6, which provides the same function as does the check valve CV 5, is connected in parallel with the normally-open linear solenoid valve PC2.

As is apparent from the above description, the HU 40 is composed of two hydraulic circuit systems; i.e., a hydraulic circuit system regarding the rear right wheel RR and the front left wheel FL and a hydraulic circuit system regarding the rear left wheel RL and the front right wheel FR. The HU 40 is configured such that when all the solenoid valves are in their unexcited states, brake hydraulic pressure (i.e., master cylinder pressure Pm) corresponding to the operation force of the brake pedal BP is supplied to the wheel cylinder W**.

Notably, the symbol "" appended to various variables and the like collectively represents the symbols fl, fr, rl and rr and indicates that the particular variable or the like applies to all of the wheels FR, FL, etc. of the vehicle. For example, the wheel cylinder W collectively indicates the wheel cylinder Wfl for the front left wheel, the wheel cylinder Wfr for the front right wheel, the wheel cylinder Wrl for the rear left wheel, and the wheel cylinder Wrr for the rear right wheel.

Meanwhile, the HU 40 is configured such that when the motor MT (accordingly, the hydraulic pumps HP1 and HP2) is driven and the normally-open linear solenoid valves PC1 and PC2 are excited by an instruction current Id in this state, brake hydraulic pressure which is higher than the master cylinder pressure Pm by an instruction differential pressure ΔPd determined in accordance with the instruction current Id can be supplied to the wheel cylinder W**.

In addition, the HU 40 is configured such that the wheel cylinder pressure PW can be individually adjusted through control of the pressure-increasing valve PU and the pressure-reducing valve PD**. That is, the HU 40 is configured to individually adjust the brake forces applied to the respective wheels independently of operation of the brake pedal BP by the driver. Thus, the HU 40 can achieve vehicle stabilization control, which will be described later, in accordance with an instruction from the ECU 50.

Referring back to FIG. 1, the ECU 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus.

The interface 55 is connected to a vehicle speed sensor 61**, accelerator opening sensor 62 and steering angle sensor 63 (actual-turning-angle-corresponding-value sensor), those of which are separate from the integrated unit, via predetermined harnesses, connectors and the like, so as to be capable of performing CAN communication. Further, the interface 55 is electrically connected directly with a yaw rate sensor 64 (actual-yaw-rate-corresponding-value sensor) incorporated in the integrated unit without using harnesses or connectors.

The wheel speed sensors 61fl, 61fr, 61rl and 61rr are electromagnetic-pickup-type sensors which respectively output signals having frequencies corresponding to the respective rotational speeds of the wheels FL, FR, RL and RR. The acceleration opening sensor 62 detects an operated amount of an accelerator pedal AP operated by a driver and outputs a signal indicative of the operation amount Accp of the accelerator pedal AP. The steering angle sensor 63 detects a rotational angle of a steering wheel ST from its neutral position and outputs a signal indicative of the actual steering angle θs (actual-turning-angle-corresponding-value). The yaw rate sensor 64 detects a yaw rate of the vehicle and outputs a signal indicative of the actual yaw rate Yr (actual-yaw-rate-corresponding-value).

The steering angle θs is zero when the steering wheel ST is located at the neutral position. The steering angle θs assumes a positive value when the steering wheel ST is turned counterclockwise (as viewed from a driver side), and assumes a negative value when the steering wheel ST is turned clockwise. The actual yaw rate Yr assumes a positive value when the vehicle turns to the left (counterclockwise as viewed from the upper side of the vehicle), and assumes a negative value when the vehicle turns to the right.

The interface 55 supplies signals from the sensors 61 to 64 to the CPU 51. Further, in accordance with instructions from the CPU 51, the interface 55 outputs drive signals to the respective solenoid valves and the motor MT of the HU 40, the throttle valve actuator 22, and the fuel infection apparatus 23.

By virtue of the above-described configuration, the throttle valve actuator 22 drives the throttle valve TH such that the opening TA of the throttle valve TH basically coincides with an opening corresponding to the operation amount Accp of the accelerator pedal AP; and the fuel injection apparatus 23 injects fuel of a quantity which is required to obtain a predetermined target air-fuel ratio (theoretical air-fuel ratio) for cylinder-interior intake air quantity, which is the quantity of air taken into each cylinder. Further, the instruction currents Id (supply current) of the normally-open linear solenoid valves PC1 and PC2 are adjusted by adjusting the duty ratio of the supply current.

Outline of Vehicle Stabilization Control

Next, there will be described vehicle stabilization control (specifically, under-steer suppressing control), which is performed by the motion control apparatus 10 (hereinafter referred to as "the present apparatus") according to the embodiment of the present invention having the above described configuration. The vehicle stabilization control is a control which suppresses an under-steer state of the vehicle to thereby maintain the turning-trace performance of the vehicle.

Firstly, the turning angle yaw rate Yrt (turning-angle-yaw-rate-corresponding-value) is defined based upon the following Equation (1), which is based upon the theoretical formula led from a motion model of the vehicle. This turning angle yaw rate Yrt is a yaw rate obtained based upon the actual steering angle θs.

$$Yrt=(Vso \cdot \theta s)/(n \cdot L) \cdot (1/(1+Kh \cdot Vso^2)) \qquad (1)$$

In the above Equation (1), Vso is the above-mentioned estimated vehicle body speed, L is the wheel base of the vehicle, Kh is the stability factor, and n is the steering gear ratio. The wheel base L, stability factor Kh and steering gear ratio n are constants determined in accordance with the specifications of the vehicle.

The turning angle yaw rate Ytr is set such that when the vehicle is turning in the left direction (i.e., when the actual steering angle θs has a positive value) it becomes a positive value, and when the vehicle is turning in the right direction (i.e., when the actual steering angle θs has a negative value) it becomes a negative value. This theoretical formula is for calculating the theoretical value of the yaw rate when the vehicle is turning in a state where the steering angle and the vehicle body speed are both constant (at the time of steady circular turning).

Further, in accordance with the following Equation (2), the present apparatus calculates the yaw rate deviation ΔYr. Specifically, this yaw rate deviation ΔYr is a value obtained by subtracting the absolute value of the actual yaw rate Yr, that can be obtained by use of the yaw rate sensor 64, from the absolute value of the turning angle yaw rate Yrt.

$$\Delta Yr=|Yrt|-|Yr| \qquad (2)$$

When the yaw rate deviation ΔYr calculated with the above Equation (2) is a positive value, the vehicle is in a state where the turning radius is greater than in a case where the actual yaw rate of the vehicle is assumed to be equal to the turning angle yaw rate Yrt. Specifically, the yaw rate deviation ΔYr can be a value indicating the degree of instability relating to the turning of the vehicle. Accordingly, the present apparatus determines that the vehicle is in an "under-steer state" when the yaw rate deviation ΔYr is greater than a threshold value Yrth (>0).

When the yaw rate deviation ΔYr (actually, yaw rate deviation ΔYr based upon the following Equation (3) instead of the above-mentioned Equation (2) as described later) exceeds the threshold value Yrth, the present apparatus determines that the vehicle is in an "under-steer state", and executes under-steer suppression control (US suppression control) in order to suppress the under-steer state. Specifically, the present apparatus obtains an US-suppression-control-use control value Gstr on the basis of the yaw rate deviation ΔYr and with reference to a previously prepared table, which defines the relation between the yaw rate deviation ΔYr and the US-suppression-control-use control value Gstr.

The present apparatus then applies to the rear wheel located on the inner side of a turning locus a braking force corresponding to the obtained US-suppression-control-use control value Gstr (≠0), by means of brake hydraulic pressure. As result, a yawing moment is forcedly generated in the vehicle in a direction same as the yawing direction. Accordingly, the absolute value of the actual yaw rate Yr increases, so that the actual yaw rate Yr is controlled to approach the turning angle yaw rate Yrt (i.e., that the yaw rate deviation ΔYr becomes not more than the threshold value Yrth). As a result, the turning-trace performance of the vehicle can be maintained.

Further, when the present apparatus determines that the vehicle is in an "under-steer state", it performs, in addition to the above-mentioned application of braking force by means of brake hydraulic pressure, the engine-output lowering control which lowers a predetermined amount the output of the engine 21 from a level corresponding to the accelerator pedal operation amount Accp. As a result, centrifugal force acting on the vehicle decreases because of the lowered vehicle body speed, so that the turning-trace performance of the vehicle can be maintained. The above is the outline of the vehicle stabilization control (US suppression control).

Calculation of Yaw Rate Deviation Considering Prevention of Malfunction

As described above, the integrated unit is fixed to the vehicle body via a predetermined mount made of an elastic member. Accordingly, when the vehicle body vibrates, due to an input or the like from a road surface, with a frequency around the frequency specific to the mount, the vibration at the vehicle body is amplified by a resonance and can be transmitted to the integrated unit. Further, a vibration is generated on the integrated unit due to the operation of the hydraulic pumps HP1 and HP2, solenoid valves PU and PD or the like mounted in the integrated unit.

Accordingly, each vibration imparted to the integrated unit can also be transmitted to the yaw rate sensor 64 incorporated in the integrated unit. As a result, the value of the actual yaw rate Yr becomes fluctuating with respect to the true yaw rate Yrtrue. Specifically, a vibration noise is superimposed on the actual yaw rate Yr.

Figure 4:
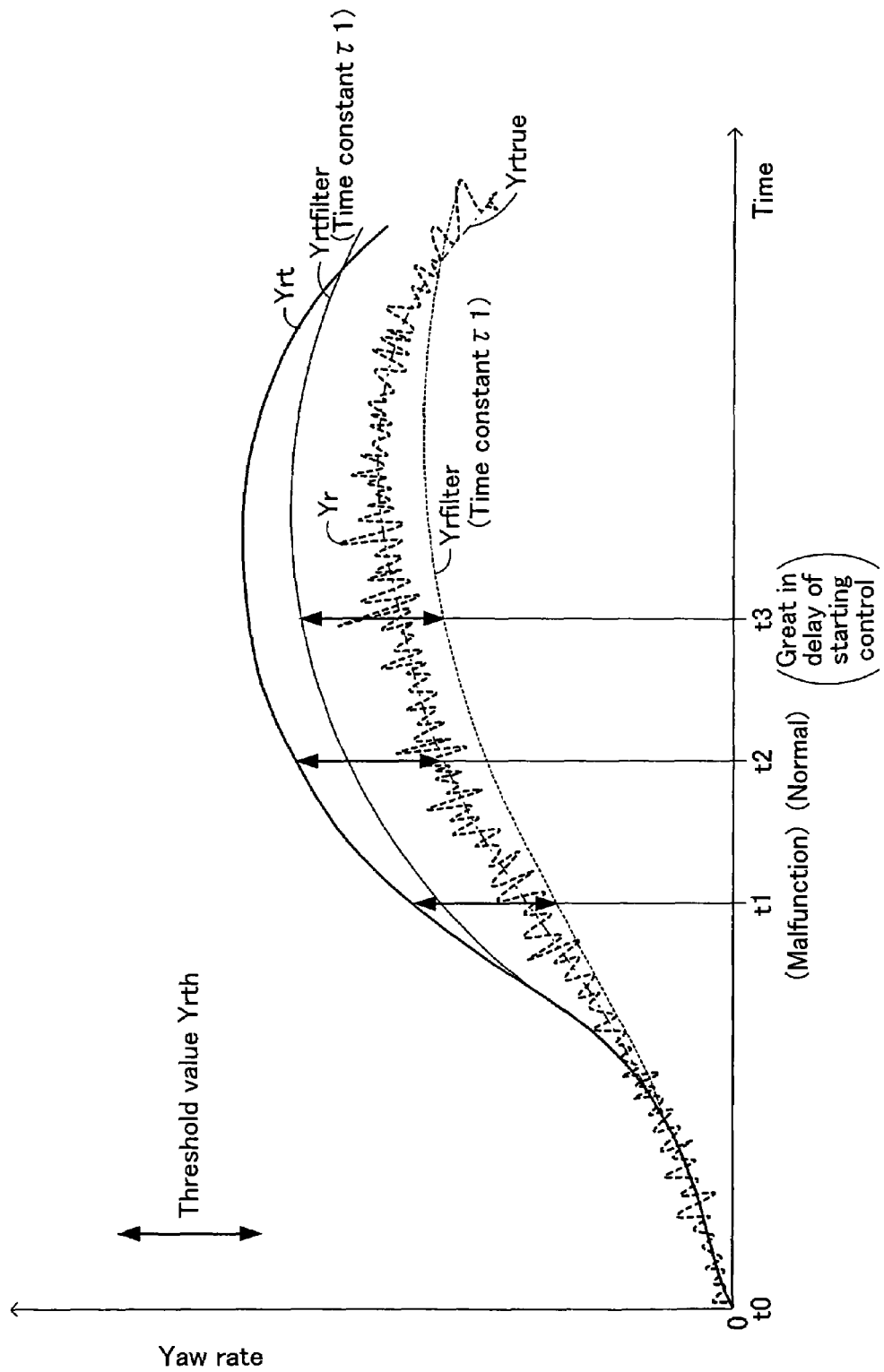
FIG. 4 is a time chart showing one example of a change in a turning angle yaw rate, a value obtained by providing a low-pass filter process to the turning angle yaw rate with a time constant $\tau 1$, an actual yaw rate, a value obtained by providing the low-pass filter process to the actual yaw rate with the time constant $\tau 1$, and a true yaw rate.

FIG. 4 shows an example of variation of each yaw rate, in case where the yaw rate deviation, which is obtained by subtracting the true yaw rate Yrtrue (two-dot-chain line) from the turning angle yaw rate Yrt (bold solid line) calculated by the Equation (1) (hereinafter referred to as "true yaw rate deviation"), exceeds the threshold value Yrth at time t2, i.e., in case where the US suppression control should be started at time t2.

As shown in FIG. 4, the value of the actual yaw rate Yr (bold solid line) becomes fluctuating with respect to the true yaw rate Yrtrue (two-dot-chain line). As a result, the value of the yaw rate deviation ΔYr defined in the Equation (2) is also fluctuating, so that it is undesirable to use the yaw rate deviation ΔYr defined in the Equation (2) for the determination of under-steer state (i.e., determination of start of the US suppression control).

In order to eliminate the vibration noise superimposed on the actual yaw rate Yr, a low-pass filter process may be provided to the actual yaw rate Yr. Accordingly, the value (Yrt−Yrfilter) obtained by subtracting the value, which is obtained by providing the low-pass filter to the actual yaw rate Yr (actual-yaw-rate-after-low-pass-filter-process Yrfilter), from the turning angle yaw rate Yrt is defined as the yaw rate deviation ΔYr, so that it is considered to use this yaw rate deviation ΔYr for the determination of the start of the US suppression control.

In this case, the vibration noise can surely be eliminated as the time constant of the low-pass filter in the low-pass filter process (hereinafter referred to as "actual-yaw-rate-side time constant") increases. The actual-yaw-rate-after-low-pass-filter-process Yrfilter (thin broken line) shown in FIG. 4 is a value obtained by providing the low-pass filter process, which uses, as the actual-yaw-rate-side time constant, the time constant τ1 (e.g., 30 msec) that is great enough to eliminate the vibration noise, to the actual yaw rate Yr.

As shown in FIG. 4, the value of the actual-yaw-rate-after-low-pass-filter-process Yrfilter fluctuates with the delay by the time in accordance with the time constant τ1 from the value of the actual yaw rate Yr (or true yaw rate Yrtrue). This acts in the direction in which the value of the yaw rate deviation ΔYr (=Yrt−Yrfilter) becomes greater than the "true yaw rate deviation" under the condition where the "true yaw rate deviation" increases.

This allows the yaw rate deviation ΔYr to exceed the threshold value Yrth at time t1 that is before time t2. As a result, a malfunction may be caused in which the under-steer suppression control is started earlier from time t1*l*.

In order to prevent the malfunction, it is necessary that the value of the yaw rate deviation ΔYr used for the determination of the start of the US suppression control is kept to be not more than the "true yaw rate deviation" under the condition where the "true yaw rate deviation" increases. Therefore, the low-pass filter process is provided not only to the actual yaw rate Yr but also to the turning angle yaw rate Yrt, whereby the value (Yrtfilter−Yrfilter) obtained by subtracting the actual-yaw-rate-after-low-pass-filter-process Yrfilter from the turning angle yaw rate Yrt to which the low-pass filter is provided (turning-angle-yaw-rate-after-low-pass-filter-process Yrtfilter) is taken as the yaw rate deviation ΔYr, and it is considered that this yaw rate deviation ΔYr is used for the determination of the start of the US suppression control. The time constant of the low-pass filter to the turning angle yaw rate Yrt in the low-pass filter process is referred to as "turning-angle-yaw-rate-side time constant".

The turning-angle-yaw-rate-after-low-pass-filter-process Yrtfilter (thin solid line) shown in FIG. 4 is a value obtained by providing the low-pass filter process, using, as the turning-angle-yaw-rate-side time constant, the time constant τ1 same as the actual-yaw-rate-side time constant, to the turning angle yaw rate Yrt.

The value of the turning-angle-yaw-rate-after-low-pass-filter-process Yrtfilter also fluctuates with the delay by the time in accordance with the turning-angle-yaw-rate-side time constant (the time constant τ1 in FIG. 4) from the value of the turning angle yaw rate Yrt. This acts in the direction in which the value of the yaw rate deviation ΔYr (=Yrtfilter−Yrfilter) becomes smaller than the aforesaid yaw rate deviation ΔYr (=Yrt−Yrfilter) under the condition where the "true yaw rate deviation" increases.

Accordingly, the turning-angle-yaw-rate-side time constant is adjusted with respect to the actual-yaw-rate-side time constant (e.g., the aforesaid time constant τ1), whereby the value of the yaw rate deviation ΔYr (=Yrtfilter−Yrfilter) used for the determination of the start of the US suppression control can be maintained to be not more than the "true yaw rate deviation".

However, in the case shown in FIG. 4, when the turning-angle-yaw-rate-side time constant becomes equal to the actual-yaw-rate-side time constant (the time constant τ1), the degree of the delay in the fluctuation of the actual-yaw-rate-after-low-pass-filter-process Yrfilter becomes equal to the degree of the delay in the fluctuation of the turning-angle-yaw-rate-after-low-pass-filter-process Yrtfilter.

Therefore, the fluctuation in the "true yaw rate deviation" appears as the fluctuation in the yaw rate deviation ΔYr (=Yrtfilter−Yrfilter) by the delay of the time in accordance with the time constant τ1. Accordingly, the time t3 when the yaw rate deviation ΔYr exceeds the threshold value Yrth is delayed by the time in accordance with the time constant τ1 from the time t2 when the "true yaw rate deviation" exceeds the threshold value Yrth (i.e., the time when the US suppression control should be started).

On the other hand, the time constant τ1 is a value great enough to eliminate the vibration noise superimposed on the actual yaw rate Yr. From the above, the time t3 when the US suppression control is started is greatly delayed from the time t2 when the US suppression control should originally be started.

Figure 5:
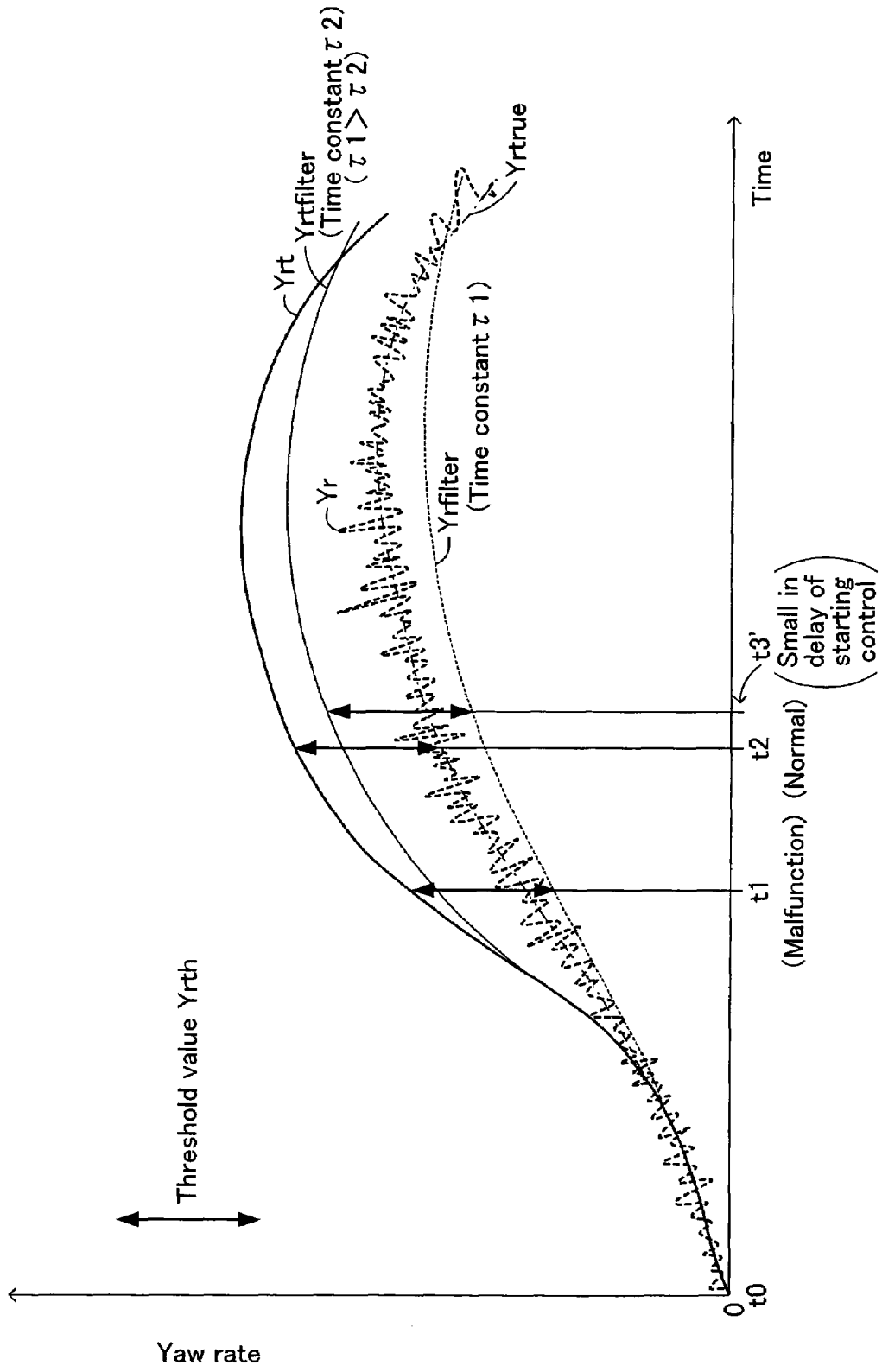
FIG. 5 is a time chart showing one example of a change in a turning angle yaw rate, a value obtained by providing a low-pass filter process to the turning angle yaw rate with a time constant $\tau 2$ ($<\tau 1$), an actual yaw rate, a value obtained by providing the low-pass filter process to the actual yaw rate with the time constant $\tau 1$, and a true yaw rate.

In order to prevent that the point when the US suppression control is started is greatly delayed, the turning-angle-yaw-rate-side time constant may be set so as to be less than the actual-yaw-rate-side time constant. FIG. 5 shows the case where the turning-angle-yaw-rate-side time constant is set smaller (time constant τ2, e.g., 20 msec) than the time constant τ1 (e.g., 30 msec) which is the actual-yaw-rate-side time constant.

In this case, the degree of the delay in the fluctuation of the turning-angle-yaw-rate-after-low-pass-filter-process Yrtfilter decreases compared to the case shown in FIG. 4. This acts in the direction in which the yaw rate deviation ΔYr (=Yrtfilter−Yrfilter) increases, so that time t3' when the yaw rate deviation ΔYr exceeds the threshold value Yrth can be advanced from the time t3 shown in FIG. 4.

As a result, the degree of the delay of the point when the US suppression control is started can be decreased, while setting the actual-yaw-rate-side time constant to a sufficiently great value (the time constant τ1) in order to sufficiently eliminate the vibration noise superimposed on the actual-yaw-rate-corresponding-value.

From the above, the present apparatus calculates the yaw rate deviation ΔYr (yaw-rate-deviation-corresponding-value) used for the determination of the start of the US suppression control in accordance with the Equation (3) instead of the Equation (2). In the Equation (3), the time constant (i.e., turning-angle-yaw-rate-side time constant) of the low-pass filter provided to the turning-angle-yaw-rate-after-low-pass-filter-process Yrtfilter is the time constant τ2, while the time constant (i.e., actual-yaw-rate-side time constant) of the low-pass filter provided to the actual-yaw-rate-after-low-pass-filter-process Yrfilter is the time constant τ1 (>τ2). The above is the explanation about the calculation of the yaw rate deviation considering the prevention of the malfunction.

$$\Delta Yr = |Yrtfilter| - |Yrfilter| \qquad (3)$$

Actual Operation

Next, the actual operation of the motion control apparatus 10 according to the embodiment of the present invention configured as described above will be explained with reference to FIGS. 6 to 8, which show routines executed by the CPU 51 of the ECU 50 in the form of flowcharts.

Figure 6:
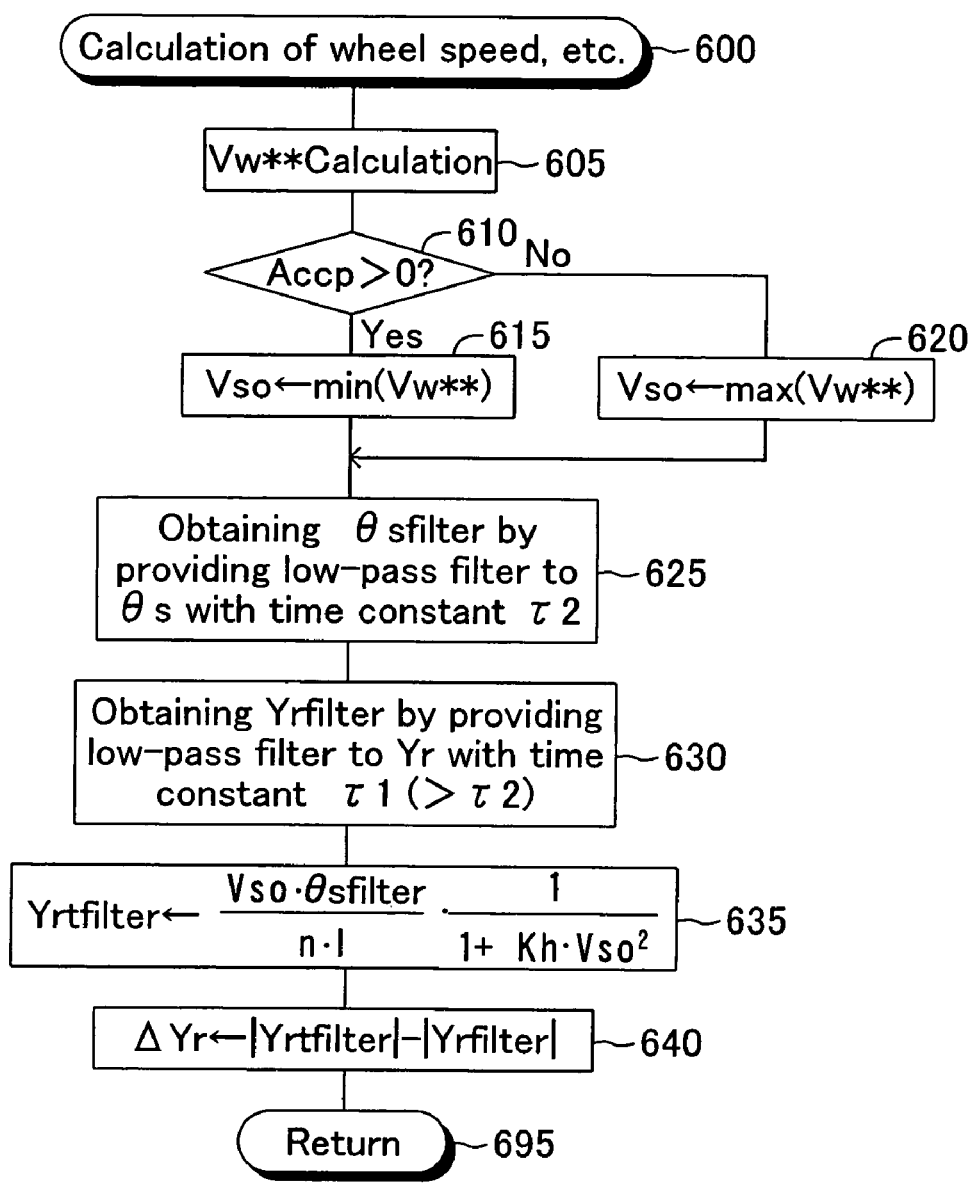

The CPU 51 repeatedly executes a routine shown in FIG. 6 for calculation of wheel speeds, etc. every time a predetermined time (execution interval Δt: e.g., 6 msec) elapses. Accordingly, when a predetermined timing has come, the CPU 51 initiates the processing from Step 600 and proceeds to Step 605 so as to respectively calculate present wheel speeds (outer circumferential speeds) Vw of the wheels . Specifically, the CPU 51 respectively calculates the wheel speeds Vw on the basis of the fluctuation frequencies of the output values of the wheel speed sensors 61.

Next, the CPU 51 proceeds to Step 610 and determines whether the accelerator pedal operation amount Accp obtained from the accelerator opening sensor 62 is greater than "0" (that is, whether the vehicle is in a driven state or in a braked state). When the CPU 51 makes a "YES" determination (when the vehicle is in a driven state), it proceeds to Step 615 so as to select the smallest value from the wheel speeds Vw as the estimated vehicle body speed Vso. On the other hand, when the CPU 51 makes a "NO" determination (when the vehicle is in a braked state), it proceeds to Step 620 so as to select the largest value from the wheel speeds Vw as the estimated vehicle body speed Vso.

Next, the CPU 51 proceeds to Step 625 so as to provide the low-pass filter process to the actual steering angle θs, which is obtained from the steering angle sensor 63, with the time constant τ2 for obtaining the actual-steering-angle-after-low-pass-filter-process θsfilter.

Then, the CPU 51 proceeds to Step 630 so as to provide the low-pass filter process to the actual yaw rate Yr, which is obtained from the yaw rate sensor 64, with the time constant τ1 (>time constant τ2) for obtaining the actual-yaw-rate-after-low-pass-filter-process Yrfilter. This value corresponds to the "value obtained by providing the low-pass filter to the actual-yaw-rate-correspond ing-value".

Next, the CPU 51 proceeds to Step 635 so as to calculate the turning-angle-yaw-rate-after-low-pass-filter-process Yrtfilter on the basis of the estimated vehicle body speed Vso calculated in the above-mentioned Steps 615 or 620, the steering-angle-after-low-pass-filter-process θsfilter, and the above-mentioned Equation (1). This value corresponds to the "turning-angle-yaw-rate-corresponding-value and the value to which the low-pass filter process is provided".

Then, the CPU 51 proceeds to Step 640 so as to calculate the yaw rate deviation ΔYr (yaw-rate-deviation-corresponding-value) on the basis of the turning-angle-yaw-rate-after-low-pass-filter-process Yrtfilter, the actual-yaw-rate-after-low-pass-filter-process Yrfilter, and the above-mentioned Equation (3), and then proceeds to Step 695 to end the current execution of the present routine. This Step 640 corresponds to yaw-rate-deviation-corresponding-value obtaining means. After that, the CPU 51 updates the respective values by repeatedly executing the present routine at the execution time intervals Δt.

Figure 7:
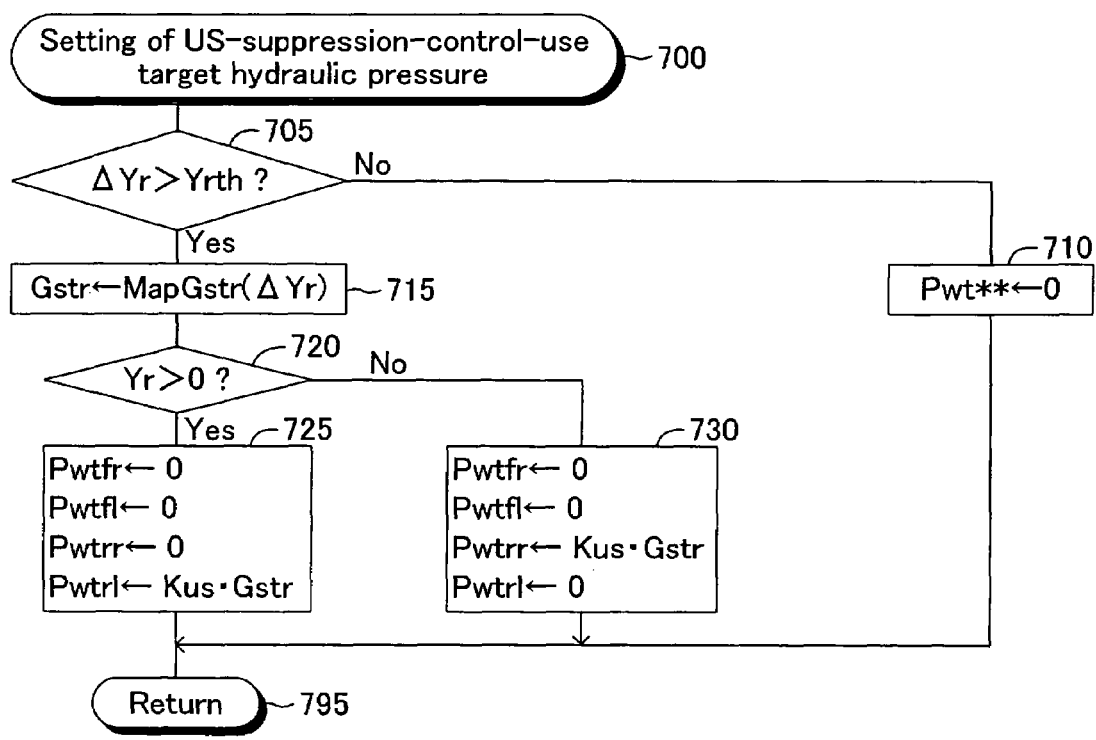
FIG. 7 is a flowchart showing a routine executed by the CPU shown in FIG. 1 for setting a target hydraulic pressure for US suppression control.

Further, the CPU 51 repeatedly executes a routine shown in FIG. 7 for setting the target hydraulic pressure for the US suppression control every time a predetermined time (e.g., 6 msec) elapses. Accordingly, when a predetermined timing has come, the CPU 51 initiates the processing from Step 700 and proceeds to Step 705 so as to determine whether the yaw rate deviation ΔYr calculated in the previously described Step 640 is greater than the threshold value Yrth. When the CPU 51 makes a "NO" determination (i.e., when the vehicle is not in an under-steer state), it proceeds to Step 710 so as to set the US-suppression-control-use target hydraulic pressures Pwt** for all the wheels to "0". Then, the CPU 51 proceeds directly to Step 795 so as to end the current execution of the present routine.

Figure 9:
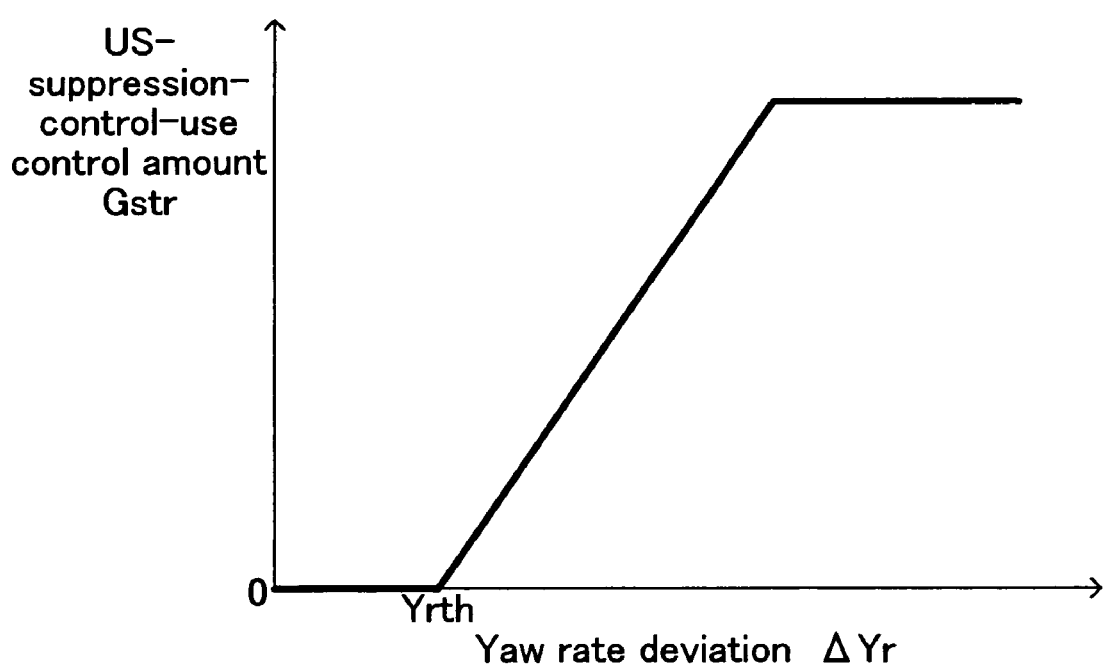
FIG. 9 is a graph showing a table which defines the relation between yaw rate deviation and US-suppression-control-use control amount and to which the CPU shown in FIG. 1 refers.
Figure 10:
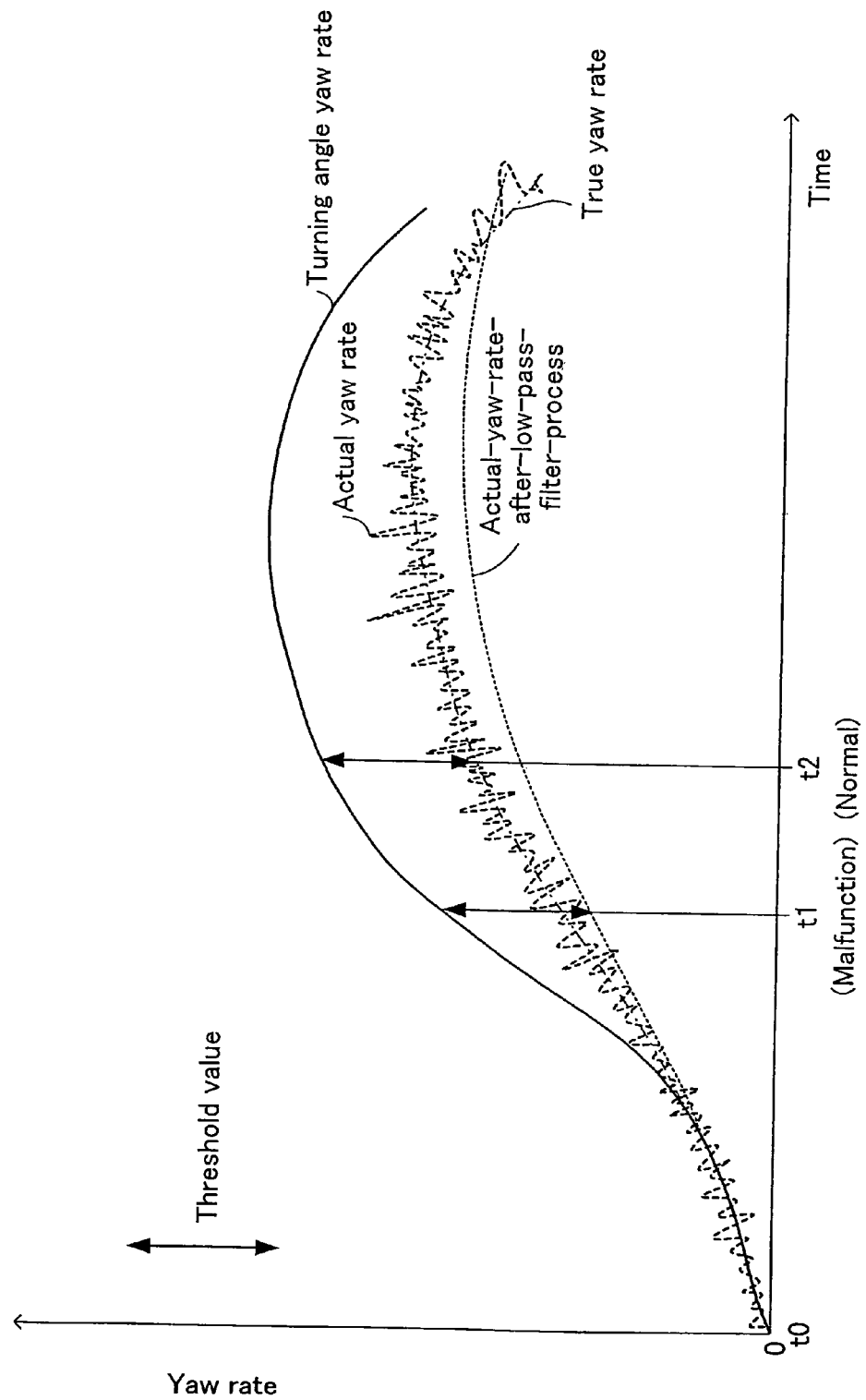
FIG. 10 is a time chart according to the prior art showing one example of a change in a turning angle yaw rate, an actual yaw rate, an actual-yaw-rate-after-low-pass-filter-process that is the value obtained by providing the low-pass filter process to the actual yaw rate, and a true yaw rate.

Here, the yaw rate deviation ΔYr is assumed to be greater than the threshold value Yrth (i.e., the vehicle is assumed to be in an under-steer state). In this case, the CPU 51 makes a "YES" determination in Step 705, and then, proceeds to Step 715 so as to obtain the US-suppression-control-use control value Gstr on the basis of the yaw rate deviation ΔYr and with reference to a previously prepared table MapGstr, which defines the relation between the yaw rate deviation ΔYr and the US-suppression-control-use control value Gstr shown in FIG. 9. Thus, in case where the yaw rate deviation ΔYr is greater than the threshold value Yrth, it is set such that the US-suppression-control-use control value Gstr (>0) increases as the yaw rate deviation ΔYr increases.

Subsequently, the CPU 51 proceeds to Step 720 so as to determine whether the yaw rate deviation ΔYr obtained from the yaw rate sensor 64 is positive (i.e., turning direction is leftward or rightward)

When the vehicle is turning to the left, the CPU 51 makes "YES" determination in Step 720, and then, proceeds to Step 725 so as to set the US-suppression-control-use target hydraulic pressure Pwtrl for the rear left wheel RL corresponding to the rear wheel located on the inner side of the turning locus to a value obtained by multiplying the obtained US-suppression-control-use control value Gstr by a coefficient Kus (positive constant) for US suppression control, and set the US-suppression-control-use target hydraulic pressure Pwt** for the remaining three wheels to "0". Then, the CPU 51 proceeds to Step 795 so as to end the current execution of the present routine.

Meanwhile, when the vehicle is turning to the right, the CPU 51 makes a "NO" determination in Step 720, and then, proceeds to Step 730 so as to set the US-suppression-control-use target hydraulic pressure Pwtrr for the rear right wheel RR corresponding to the rear wheel located on the inner side of the turning locus to a value obtained by multiplying the obtained US-suppression-control-use control value Gstr by the coefficient Kus (positive constant) for US suppression control, and set the US-suppression-control-use target hydraulic pressure Pwt for the remaining three wheels to "0". With this operation, the target hydraulic pressure Pwt for the rear wheel located on the inner side of the turning locus is set to a value (>0) corresponding to the yaw rate deviation ΔYr.

Figure 8:
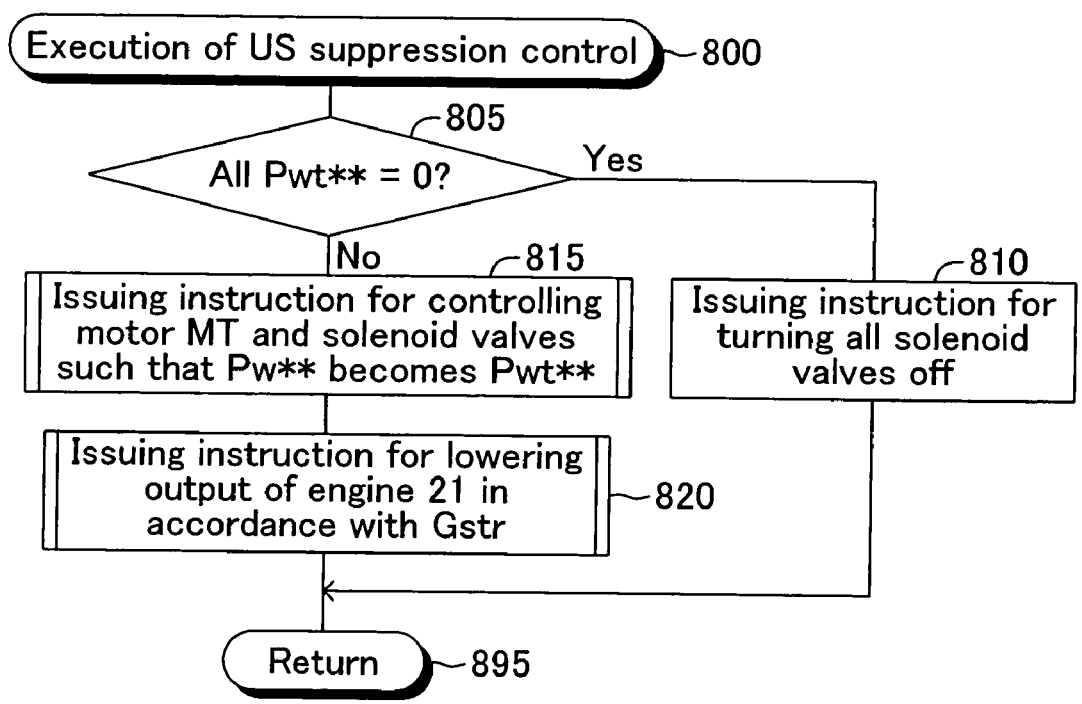
FIG. 8 is a flowchart showing a routine executed by the CPU shown in FIG. 1 for executing the US suppression control.

Further, the CPU 51 repeatedly executes a routine shown in FIG. 8 for executing the US suppression control every time a predetermined time (e.g., 6 msec) elapses. By the execution of this routine, the function of vehicle stabilization control executing means is achieved. When a predetermined timing has come, the CPU 51 initiates the processing from Step 800 and proceeds to Step 805 so as to determine the target hydraulic pressure Pwt** for all wheels is "0" or not. When the CPU 51 makes a "YES" determination, it proceeds to Step 810 so as to bring all the solenoid valves of the HU 40 into an unexcited state and bring the motor MT into an inactivated state. Subsequently, the CPU 51 proceeds directly to Step 895 so as to end the current execution of the present routine.

Meanwhile, when the CPU 51 makes a "NO" determination in Step 805, it proceeds to Step 815 and issues an instruction for controlling the motor MT and the solenoid valves of the HU 40 such that the wheel cylinder pressure Pw of the wheel  coincides with the set final target hydraulic pressure Pwt**. With this operation, the US suppression control is performed through application of braking force by means of brake hydraulic pressure.

Subsequently, the CPU 51 proceeds to Step 820 so as to issue an instruction for lowering the output of the engine 21 by an amount corresponding to the US-suppression-control-use control value Gstr obtained in the previously described Step 715. With this operation, the above-mentioned engine-output lowering control on the basis of the US suppression control is executed. Then, the CPU 51 proceeds to Step 895 so as to end the current execution of the present routine.

As described above, in the vehicle motion control apparatus according to the embodiment of the present invention, the yaw rate deviation $\Delta Yr$ is obtained by subtracting the actual-yaw-rate-after-low-pass-filter-process Yrfilter, which is the value obtained by providing the low-pass filter process to the actual yaw rate Yr, obtained from the yaw rate sensor 64 incorporated in the HU 40, with the time constant $\tau 1$ ($>\tau 2$), from the turning-angle-yaw-rate-after-low-pass-filter-process Yrtfilter, which is obtained by using the value (steering-angle-after-low-pass-filter-process θsfilter) obtained by providing the low-pass filter process to the actual steering angle θs, obtained from the steering angle sensor 63 that is separate from the HU 40, with the time constant $\tau 2$. When this yaw rate deviation $\Delta Yr$ exceeds the threshold value Yrth, the under-steer suppression control (US suppression control) is started.

With this operation, while setting the time constant $\tau 1$ to a sufficiently great value in order to sufficiently eliminate the vibration noise superimposed on the actual yaw rate Yr, the present apparatus can prevent that the malfunction is caused in which the US suppression control is started at the point before the point when the US suppression control should originally be started, and further, can decrease the degree of the delay of the point when the US suppression control is started.

The present invention is not limited to the above-mentioned embodiment, and various modifications may be employed within the scope of the invention. For example, although the yaw rate sensor is incorporated in the HU 40 in the aforesaid embodiment and the determination of the start of the US suppression control is performed by using the yaw rate deviation $\Delta Yr$ that is the yaw-rate-deviation-corresponding-value, a lateral acceleration sensor may be incorporated in the HU 40 and the determination of the start of the US suppression control may be performed by using the lateral acceleration deviation that is the yaw-rate-deviation-corresponding-value. Here, the lateral acceleration deviation is a turning angle lateral acceleration obtained in accordance with the following Equation (4) on the basis of the actual steering angle θs, and the value obtained by subtracting the value, which is obtained by providing the low-pass filter process to the actual lateral acceleration Gy obtained from the lateral acceleration sensor, from the value to which the low-pass filter process is provided.

$$Gyt=(Vso^2 \cdot \theta s)/(n \cdot L) \cdot (1/(1+Kh \cdot Vso^2)) \quad (4)$$

In the aforesaid embodiment, the turning-angle-yaw-rate-after-low-pass-filter-process Yrtfilter is obtained by applying the steering-angle-after-low-pass-filter-process θsfilter, which is the value in which the low-pass filter process is provided to the actual steering angle θs with the time constant $\tau 2$, to the Equation (1). However, the turning-angle-yaw-rate-after-low-pass-filter-process Yrtfilter may be obtained by providing the low-pass filter process to the turning angle yaw rate Yrt, which is obtained by applying the actual steering angle θs to the Equation (1), with the time constant $\tau 2$.

Further, in the aforesaid embodiment, the time constant of the low-pass filter at the side of the turning angle yaw rate Yrt (i.e., turning-angle-yaw-rate-side time constant) is set so as to be less than the time constant of the low-pass filter at the side of the actual yaw rate Yr (i.e., actual-yaw-rate-side time constant) in order to enhance the response of the low-pass filter in the low-pass filter process at the side of the turning angle yaw rate Yrt more than the response of the low-pass filter in the low-pass filter process at the side of the actual yaw rate Yr. However, it may be configured such that the cut-off frequency of the low-pass filter at the side of the turning angle yaw rate Yrt becomes higher than the cut-off frequency of the low-pass filter at the side of the actual yaw rate Yr.

Moreover, although only the under-steer suppression control is executed in the aforesaid embodiment as the vehicle stabilization control in which the yaw-rate-deviation-corresponding-value (yaw rate deviation $\Delta Yr$) is used for the determination of the start of the control, other controls may be executed such as over-steer suppression control, roll-over preventing control, or the like.

What is claimed is:

1. A vehicle motion control apparatus provided with:
   an integrated unit integrally composed of a hydraulic unit having mounted thereto plural hydraulic devices for controlling braking force imparted to wheels of a vehicle and an electronic control apparatus for controlling the plural hydraulic devices;
   an actual-yaw-rate-corresponding-value sensor that is incorporated in the integrated unit and detects a yaw-rate-corresponding-value indicating a degree of a turn of the vehicle as an actual-yaw-rate-corresponding value; and
   an actual-turning-angle-corresponding-value sensor that detects a turning-angle-corresponding-value corresponding to a turning angle of steerable wheels of the vehicle as an
   actual-turning-angle-corresponding-value,
      wherein the electronic control apparatus comprises:
         yaw-rate-deviation-corresponding-value obtaining means that obtains a yaw-rate-deviation-corresponding-value, which represents a degree of instability relating to a turn of the vehicle, on the basis of a degree of a difference between a turning-angle-yaw-rate-corresponding-value, which is the yaw-rate-corresponding-value obtained based upon the detected actual-turning-angle-corresponding-value and to which a low-pass filter process is provided, and a value obtained by providing a low-pass filter process to the detected actual-yaw-rate-corresponding-value; and
      vehicle stabilization control executing means that controls the plural hydraulic devices such that braking force for generating on the vehicle a yawing moment in the direction in which the
         yaw-rate-deviation-corresponding-value becomes not more than a threshold value is imparted to a predetermined wheel, when the obtained yaw-rate-deviation-corresponding-value exceeds the threshold value.

2. A vehicle motion control apparatus according to claim 1, wherein
   the yaw-rate-deviation-corresponding-value obtaining means is configured such that a response of a low-pass filter in the low-pass filter process to the turning-angle-yaw-rate-corresponding-value is higher than a response of a low-pass filter in the low-pass filter process to the actual-yaw-rate-corresponding-value.

3. A vehicle motion control apparatus according to claim 2, wherein
the yaw-rate-deviation-corresponding-value obtaining means is configured such that a time constant, which is a index value of the response, of the low-pass filter in the low-pass filter process to the turning-angle-yaw-rate-corresponding-value is less than a time constant, which is a index value of the response, of the low-pass filter in the low-pass filter process to the actual-yaw-rate-corresponding-value.

* * * * *